US012606238B2

(12) United States Patent
Shimizu et al.

(10) Patent No.: US 12,606,238 B2
(45) Date of Patent: Apr. 21, 2026

(54) PATH GENERATION DEVICE AND TRAVEL ASSISTANCE CONTROL DEVICE

(71) Applicant: Mitsubishi Electric Corporation, Tokyo (JP)

(72) Inventors: Yuji Shimizu, Tokyo (JP); Hiroki Manabe, Tokyo (JP); Kazuhiro Nishiwaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 198 days.

(21) Appl. No.: 18/027,166

(22) PCT Filed: Oct. 19, 2020

(86) PCT No.: PCT/JP2020/039222
§ 371 (c)(1),
(2) Date: Mar. 20, 2023

(87) PCT Pub. No.: WO2022/085042
PCT Pub. Date: Apr. 28, 2022

(65) Prior Publication Data
US 2023/0373558 A1     Nov. 23, 2023

(51) Int. Cl.
*B62D 6/00* (2006.01)
*B62D 15/02* (2006.01)
(52) U.S. Cl.
CPC ......... *B62D 6/002* (2013.01); *B62D 15/0255* (2013.01); *B62D 15/0265* (2013.01)
(58) Field of Classification Search
CPC ........................... B62D 6/002; B62D 15/0255; B62D 15/0265

USPC .......................................................... 701/42
See application file for complete search history.

(56) References Cited

U.S. PATENT DOCUMENTS

2018/0281787 A1     10/2018     Shiota et al.
2019/0217883 A1*     7/2019     Ozawa ................... B62D 6/002

FOREIGN PATENT DOCUMENTS

CN     108137046 A     6/2018
CN     109649393 A     4/2019
JP     2010-126077 A     6/2010
JP     2015-217707 A     12/2015
JP     2017-056779 A     3/2017
JP     2018-203108 A     12/2018
JP     2019-123402 A     7/2019
(Continued)

OTHER PUBLICATIONS

Office Action issued Mar. 5, 2024 in Japanese Application No. 2022-556830.
(Continued)

*Primary Examiner* — Lindsay M Low
*Assistant Examiner* — Omar Morales
(74) *Attorney, Agent, or Firm* — Sughrue Mion, PLLC

(57) ABSTRACT

A path generation device of a motor vehicle comprises: a target route-path generation unit for producing a target route-path of the motor vehicle; a lateral position compensation-quantity setting unit for setting a lateral position compensation-quantity being a compensation-quantity in a sideward direction with respect to the target route-path; and a target route-path correction unit for calculating a correction route-path on the basis of the target route-path and on that of the lateral position compensation-quantity.

16 Claims, 16 Drawing Sheets

(56)         References Cited

FOREIGN PATENT DOCUMENTS

JP         2020-032828  A      3/2020

OTHER PUBLICATIONS

International Search Report of PCT/JP2020/039222 dated Dec. 22, 2020 [PCT/ISA/210].
Chinese Office Action dated Jan. 27, 2025 in Application No. 202080106006.0.
Chinese Office Action dated Jul. 16, 2025 issued in Chinese application No. 202080106006.0.

* cited by examiner

FIG. 2

| | |
|---|---|
| ■ ■ ■ | TARGET ROUTE-PATH |
| ——— | ACTUAL RUNNING-ROUTE POSITION |

LATERAL POSITION

| | |
|---|---|
| ■ ■ ■ | STEERING ANGLE INSTRUCTION |
| ——— | ACTUAL STEERING ANGLE |

STEERING ANGLE

0

TIME

LATERAL
POSITION $y_{ofst}$ $y_{flt}$

FF STEERING
ANGLE
INSTRUCTION

0

$\delta_{FF}^*$

TIME

PATH GENERATION DEVICE AND TRAVEL ASSISTANCE CONTROL DEVICE

CROSS REFERENCE TO RELATED APPLICATIONS

This application is a National Stage of International Application No. PCT/JP2020/039222 filed on Oct. 19, 2020.

TECHNICAL FIELD

The disclosure of the present application relates to a path generation device for producing a route-path on which a motor vehicle ought to run along, and a travel assistance control device using the path generation device.

BACKGROUND ART

Conventionally, control technologies related to automatic steering and running of an automotive or motor vehicle are known. For example, a lane maintaining assistance device is disclosed in Patent Document 1 by which a lane maintaining assistance control for assisting the steering can be carried out when a motor vehicle performs its running within its vehicle lane.

RELATED ART DOCUMENT

Patent Document

Patent Document 1: Japanese Patent Laid-Open No. 2015-217707

SUMMARY OF THE INVENTION

Problems to be Solved By the Invention

In a running-route assistance control system such as lane maintaining control system or the like, a steering angle is determined by means of a control which usually performs a feedback of the deviation between a target route-path calculated based on a sensor(s) for detecting road information in front of a motor vehicle and is running route-path for the host vehicle. The motor vehicle cannot follow up a target route-path in a case in which the deviation to a targeted running-route position changes discontinuously at a time of a start-up or the like of an automatic steering system, or in a case at a time when a running-route assistance control is started up. In addition, according to a control which performs a feedback of conventional sideward or lateral position deviation, a steering angle command sharply changes at a time of starting the control, so that it is feared that swaying/rocking motion is caused in a running locus of a motor vehicle.

The present disclosure of the application concerned has been directed at solving those problems as described above, and an object of the disclosure is to obtain a path generation device capable of producing a correction route-path by which a motor vehicle can follow up its route-path by modifying a target route-path in accordance with a running state of the motor vehicle.

Means for Solving the Problems

A path generation device disclosed in the disclosure of the application concerned comprises: a target route-path generation unit for producing a target route-path of a motor vehicle; a lateral position compensation-quantity setting unit for setting a lateral position compensation-quantity being a compensation-quantity in a lateral direction with respect to the target route-path; and a target route-path correction unit for calculating a correction route-path on the basis of the lateral position compensation-quantity.

Effects of the Invention

According to the path generation device disclosed in the disclosure of the application concerned, a target route-path is modified in accordance with a running state of a motor vehicle, whereby a steering angle command does not sharply change, so that it is possible to produce a correction route-path on which the motor vehicle can follow up along its route-path.

BRIEF DESCRIPTION OF DRAWINGS

FIG. 2 is a block diagram illustrating the travel assistance control device that is provided with the path generation device according to Embodiment 1;

FIG. 9 is a block diagram illustrating a modification example of the travel assistance control device according to Embodiment 1;

FIG. 12 is a block diagram illustrating a travel assistance control device that is provided with a path generation device according to Embodiment 2;

FIG. 15 is a block diagram illustrating a travel assistance control device according to Embodiment 3;

EMBODIMENTS FOR CARRYING OUT THE INVENTION

Figure 1:
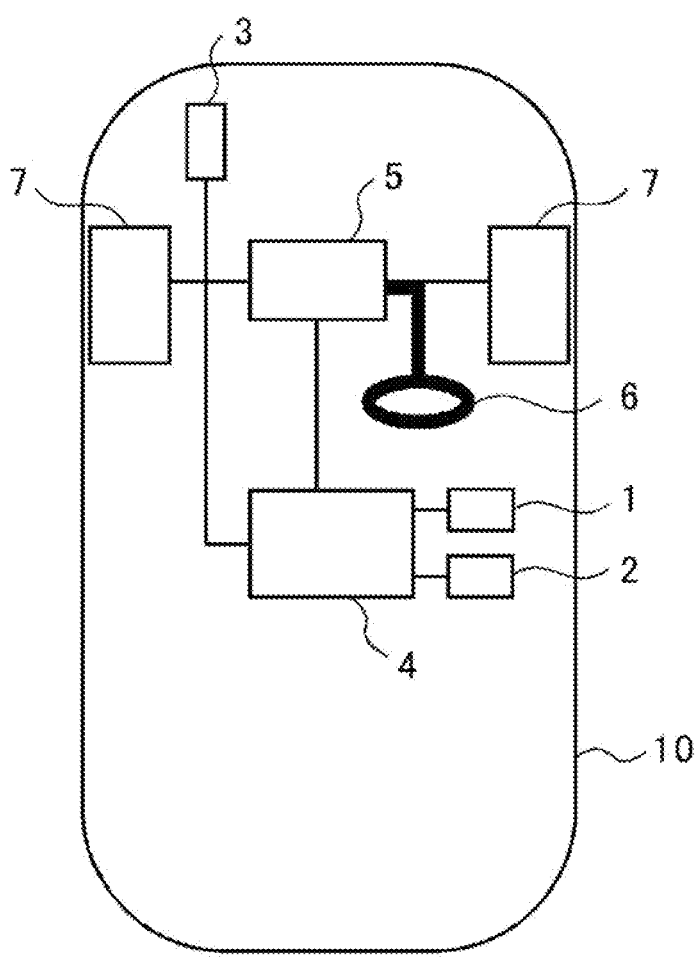
FIG. 1 is a diagram illustrating a configuration of a motor vehicle on which a travel assistance control device is mounted that is provided with a path generation device according to Embodiment 1.

Hereinafter, the explanation will be made referring to the figures for path generation devices of motor vehicles each, and running-route or travel assistance control devices thereof according to their embodiments. In each of the figures, the same or corresponding items, portions or parts designate the same reference numerals and symbols.

Embodiment 1

FIG. 1 illustrates an example of a configuration related to the steering of a motor vehicle which implements a running-route or travel assistance control device 100 of the motor vehicle.

On a motor vehicle (the vehicle itself is also referred to as a "host vehicle") 10, a vehicle velocity detector 1, a yaw rate detector 2, a camera 3, a driving assistance ECU (Electronic Control Unit) 4, a steering ECU 5, a steering mechanism 6 and turn wheels 7 are mounted. The vehicle velocity detector 1 detects a running speed or velocity of the host vehicle 10, and transmits its running velocity to the driving assistance ECU 4. The yaw rate detector 2 detects a yaw rate of the host vehicle 10, and transmits its yaw rate to the driving assistance ECU 4. The camera 3 shoots in images a white coat-line(s) drawn on a road for indicating a region of a vehicle lane(s), and transmits white coat-line information in front of the host vehicle 10 to the driving assistance ECU 4.

The driving assistance ECU 4 implements the functions of the travel assistance control device 100 as will be described later. The driving assistance ECU 4 transmits a control instruction (s) to the steering ECU 5, on the basis of a running velocity of the host vehicle 10 acquired from the vehicle velocity detector 1, on that of a yaw rate of the host vehicle 10 acquired from the yaw rate detector 2 and on that of white coat-line information in front of the host vehicle 10 acquired from the camera 3. The steering ECU 5 controls the operations of the steering mechanism 6 on the basis of the control instruction (s) from the driving assistance ECU 4. The turn wheels 7 define their angle with respect to the host vehicle 10 on the basis of the operations of the steering mechanism 6, and control the movement in a lateral or sideward direction on the host vehicle 10.

Figure 2:
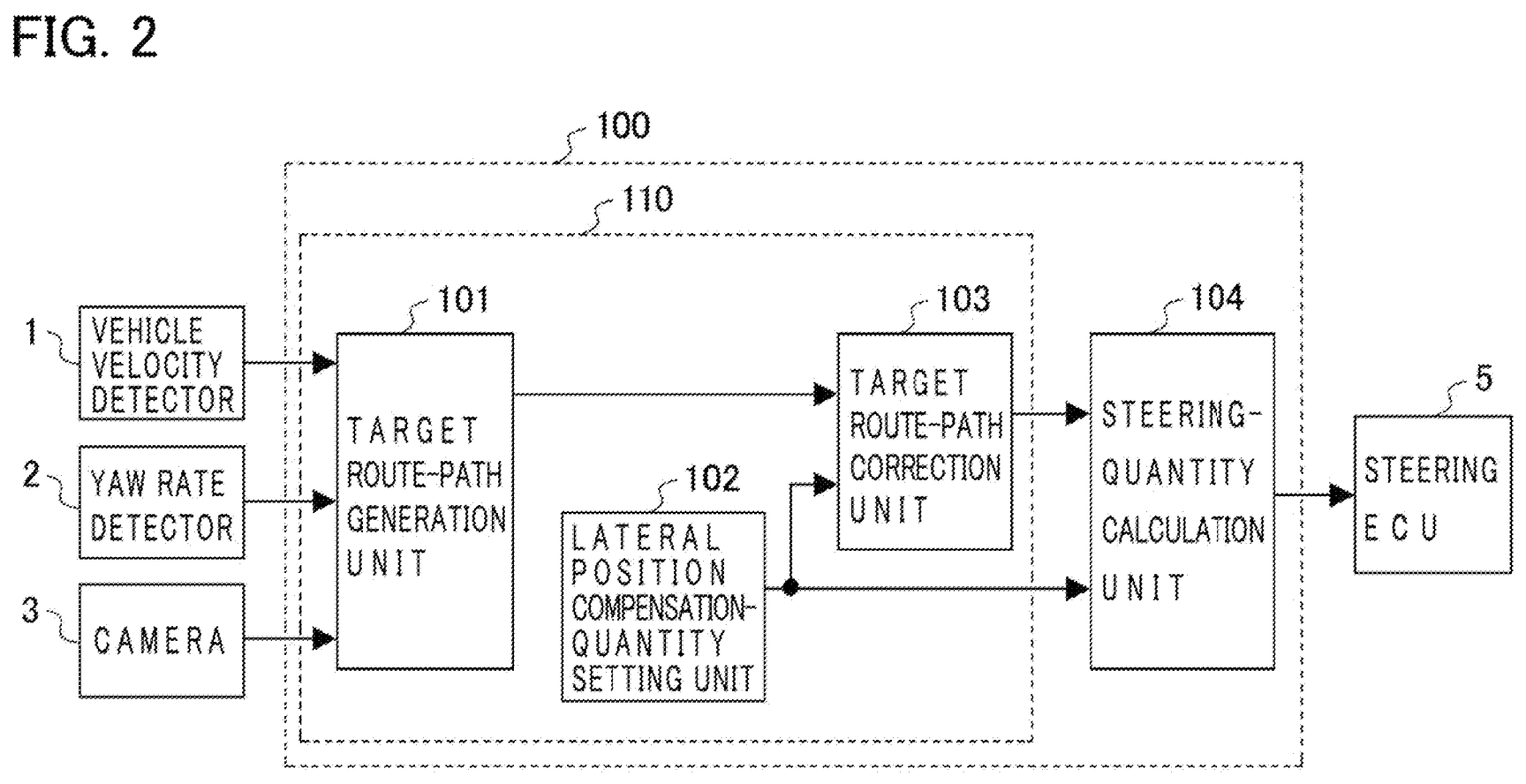

FIG. 2 is a functional block diagram for explaining the travel assistance control device 100 of a motor vehicle according to Embodiment 1.

The travel assistance control device 100 is constituted of a path generation device 110 and a steering-quantity calculation unit 104.

The path generation device 110 calculates a target route-path in front of a motor vehicle on which the motor vehicle ought to run along, on the basis of vehicle velocity detected by the vehicle velocity detector 1, on that of a yaw rate detected by the yaw rate detector 2 and on that of road information in front of the motor vehicle detected by the camera 3.

The steering-quantity calculation unit 104 produces a steering angle command δ* for running to follow up the target route-path, and outputs the steering angle command δ* into the steering ECU 5. The steering ECU 5 follows after the steering angle command δ*, and controls an actuator(s) for driving the steering of a motor vehicle so that a steering angle δ of the motor vehicle is coincident with the steering angle command δ* each other.

The path generation device 110 of a motor vehicle comprises a target route-path generation unit 101, a sideward or lateral position compensation-quantity setting unit 102, and a target route-path correction unit 103.

The target route-path generation unit 101 calculates a target route-path on the basis of information detected by the vehicle velocity detector 1, on that of information detected by the yaw rate detector 2 and on that of information detected by the camera 3, and inputs the target route-path into the target route-path correction unit 103.

The lateral position compensation-quantity setting unit 102 determines a sideward or lateral position compensation-quantity of the target route-path, which is inputted into the target route-path correction unit 103 and into the steering-quantity calculation unit 104.

The target route-path correction unit 103 corrects or modifies, on the basis of the lateral position compensation-quantity, the target route-path calculated by the target route-path generation unit 101, so that modified route-path information is inputted into the steering-quantity calculation unit 104.

A configuration of the path generation device 110 and that of the travel assistance control device 100 each described above can be made by using a computer(s), so that these configurations each are achieved by such a manner that the computer (s) executes a program(s). Namely, the target route-path generation unit 101 of the path generation device 110, the lateral position compensation-quantity, setting unit 102 thereof, the target route-path correction unit 103 thereof and the steering-quantity calculation unit 104 each mounted on the motor vehicle illustrated in FIG. 2 are achieved by means of a processor 1000 shown in FIG. 3, for example. To the processor 1000, a CPU (Central Processing Unit), a DPS (Digital Signal Processor) and/or the like are applied, so that the functions of the configurations each described above are implemented by executing a program(s) stored in a storage device 1001.

To other embodiments, the aforementioned manner is also applicable in a similar fashion.

Next, in FIG. 2, the explanation will be made in detail for the operations of each part on the path generation device 110 of a motor vehicle and on the travel assistance control device 100 thereof.

In the target route-path generation unit 101, lateral positions C0R and C0L of white coat-lines, attitude angles C1R and C1L thereof and route-path curvatures C2R and C2L thereof each with respect to a host vehicle are obtained for left and right white coat-lines each as white coat-line information in front of the host vehicle 10 acquired therefor from the camera 3.

For example, when a target route-path is defined in the center between the left and right white coat-lines, a lateral position C0 of the target route-path, an attitude angle C1 thereof and a route-path curvature C2 thereof each with respect to the host vehicle 10 are calculated by following Expression (1), Expression (2) and Expression (3).

[Expression Figure-1]

$$C0 = \frac{C0_R + C0_L}{2} \tag{1}$$

[Expression Figure-2]

$$C1 = \frac{C1_R + C1_L}{2} \tag{2}$$

Figure 3:
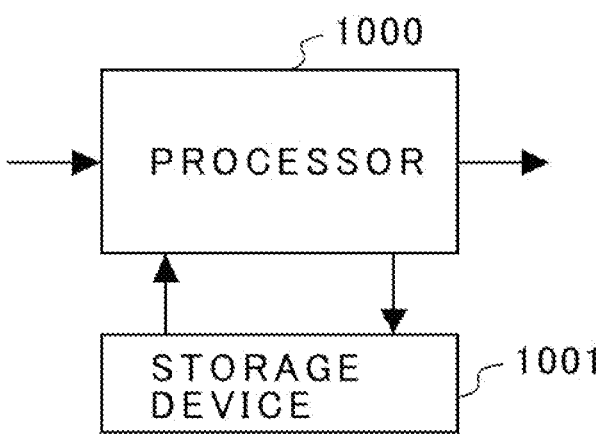
FIG. 3 is a block diagram illustrating a hardware configuration of the travel assistance control device that is provided with the path generation device according to Embodiment 1.

[Expression Figure-3]

$$C2 = \frac{C2_R + C2_L}{2} \tag{3}$$

As for a target route-path, a vehicle lane's line on which a lateral position C0 is situated either leftward or rightward may also be defined as the target route-path in accordance with a running condition as given by next Expression (4). Note that, parameter $C0_0$ is a constant, herein.

Figure 4:
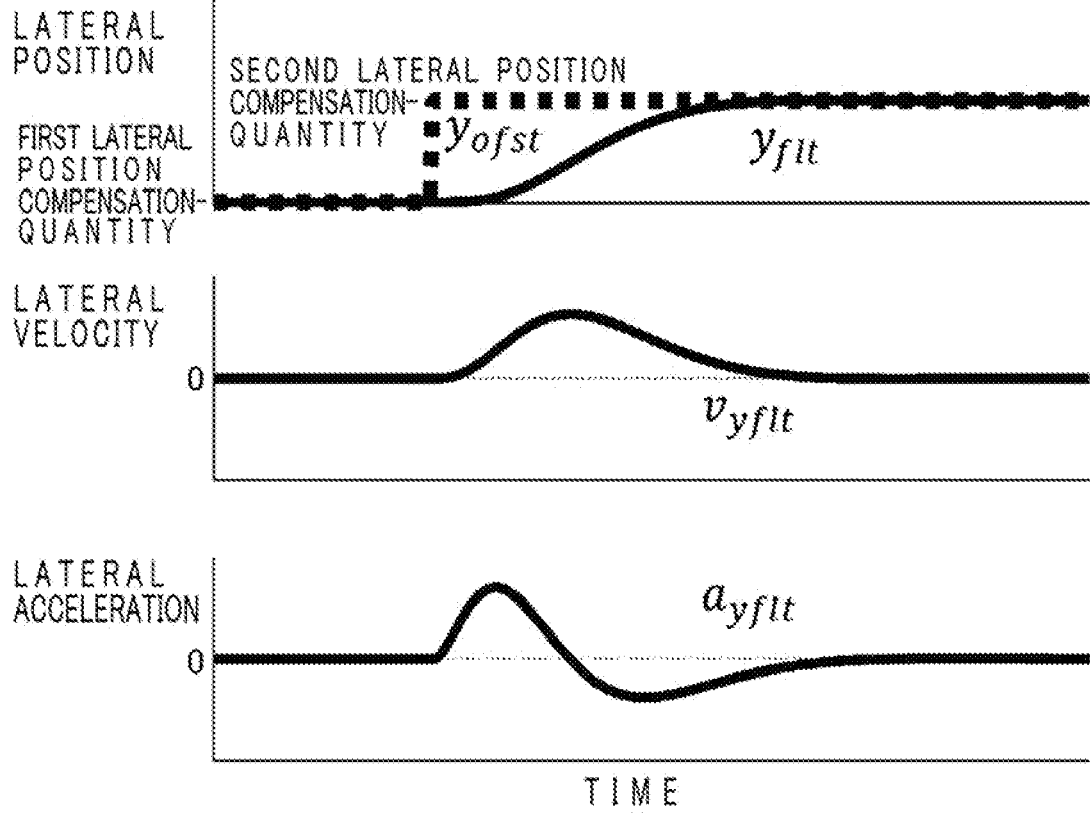
FIG. 4 is a diagram for explaining the operations of a target route-path correction unit in the path generation device according to Embodiment 1.

[Expression Figure-4]

$$C0 = \frac{C0_R + C0_L}{2} + C0_0 \tag{4}$$

In the lateral position compensation-quantity setting unit 102, a first lateral position compensation-quantity and a second lateral position compensation-quantity are set, at arbitrary timings each in accordance with a running condition or the like, independently with respect to a target route-path having been produced by the target route-path generation unit 101, and a "step input" taking on quantities from the first lateral position compensation-quantity to the second lateral position compensation-quantity is outputted as a lateral position compensation-quantity "yofst."

In the target route-path correction unit 103, a correction route-path is produced on the basis of the lateral position compensation-quantity yofst having been set by the lateral position compensation-quantity setting unit 102. A targeted lateral position yflt of the correction route-path, a targeted lateral velocity vyflt thereof and a targeted lateral acceleration ayflt thereof can be acquired by following mathematical Expression (5), Expression (6) and Expression (7) by using a lateral position compensation-quantity yofst and a filter Fdref(s). It should be noted that symbol "s" designates a Laplacian operator.

Figure 5:
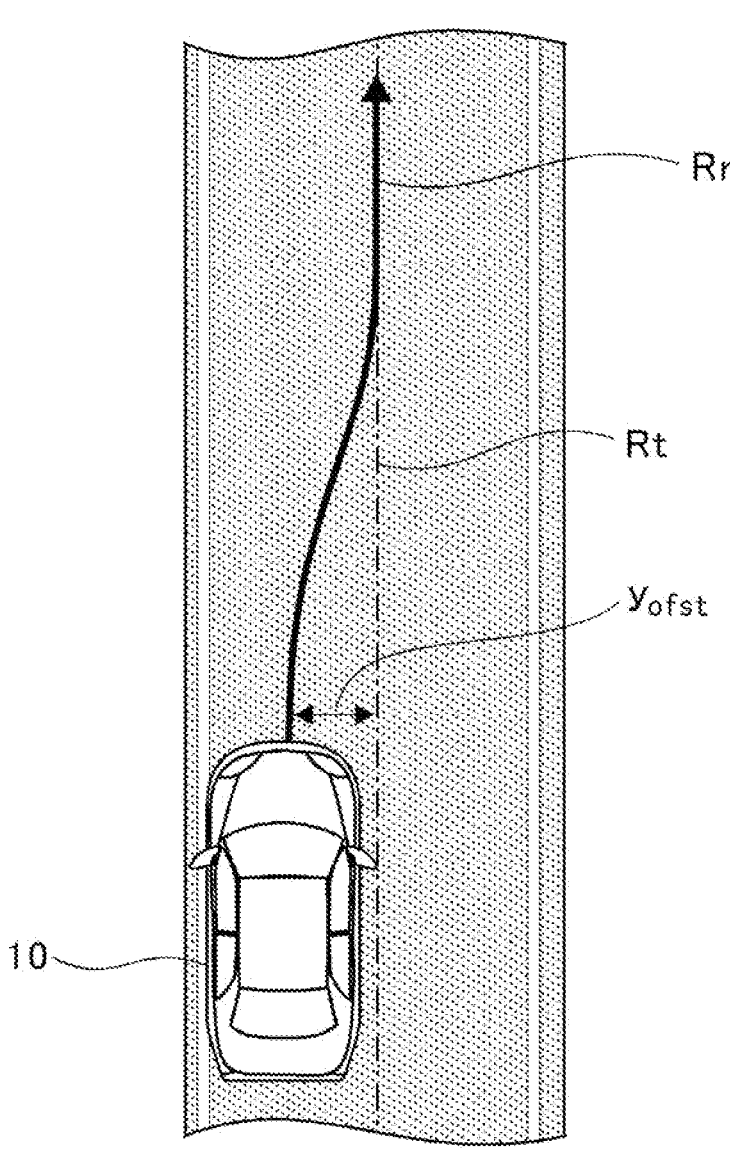
FIG. 5 is a diagram illustrating, by way of example, a running scene which becomes a controlled object of the travel assistance control device according to Embodiment 1.

[Expression Figure-5]

$$y_{flt} = F_{dref}(s) y_{ofst} \tag{5}$$

Figure 6:
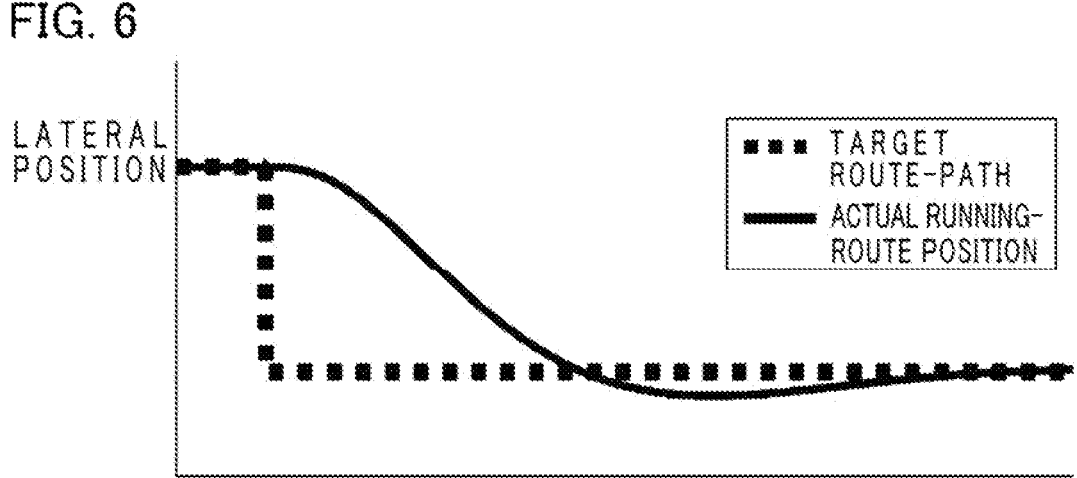
FIG. 6 is a diagram showing simulation results of the operations on a conventional motor vehicle running control in the running scene of FIG. 5.
Figure 6:
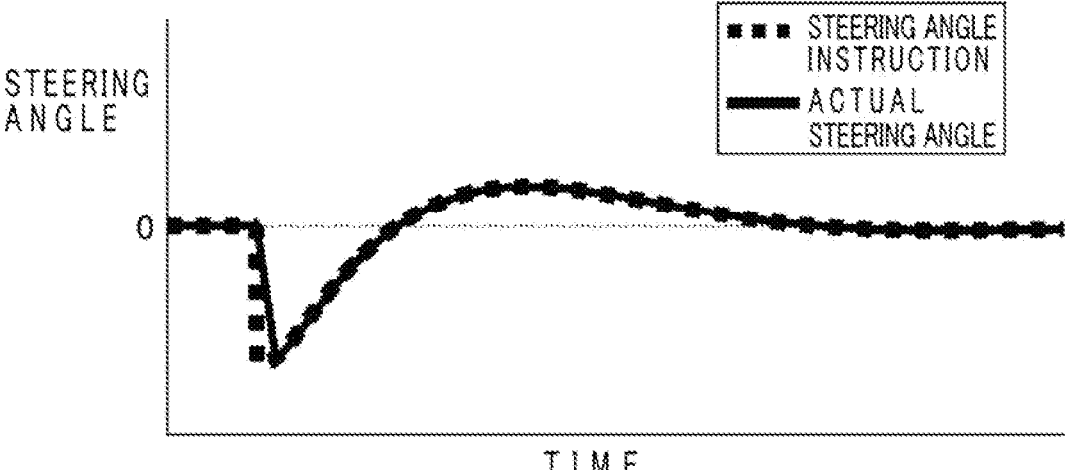

[Expression Figure-6]

$$v_{yflt} = s y_{flt} = s(F_{dref}(s) y_{ofst}) \tag{6}$$

Figure 7:
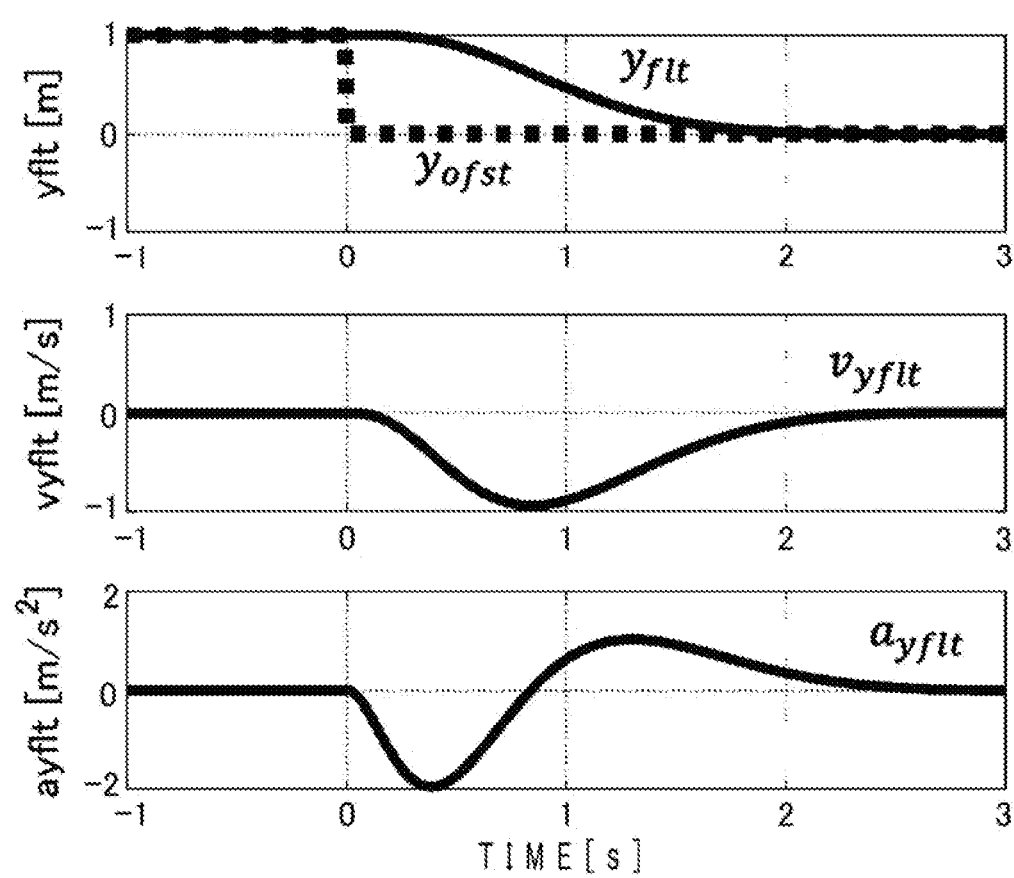
FIG. 7 is a diagram for explaining the operations of the target route-path correction unit in the path generation device according to Embodiment 1 in the running scene of FIG. 5.

[Expression Figure-7]

$$a_{yflt} = s^2 y_{flt} = s^2(F_{dref}(s) y_{ofst}) \tag{7}$$

In Expression (5) described above, an input of the filter Fdref(s) is set for a lateral position compensation-quantity yofst being a step input taking on quantities from a first lateral position compensation-quantity to a second lateral position compensation-quantity, whereby time histories up to the convergence from the first lateral position compensation-quantity to the second lateral position compensation-quantity can be produced as a correction route-path of a target route-path.

FIG. 4 shows an example of the operations of the target route-path correction unit 103.

The dotted line of operation characteristics shown at the first level (upper-row stage) of FIG. 4 indicates a time history of a lateral position compensation-quantity yofst being a step input taking on quantities from a first lateral position compensation-quantity to a second lateral position compensation-quantity, and the solid line thereof indicates a time history of a lateral position of a correction route-path. The solid line of operation characteristics shown at the second level (middle-row stage) of the same figure indicates a time history of a lateral velocity of the correction route-path. The solid line of operation characteristics shown at the third level (lower-row stage) of the same figure indicates that of a lateral acceleration of the correction route-path.

Moreover, by using Expressions (5), (6) and (7), and by making a correction route-path coincident with the formats of Expressions (1), (2) and (3) of a target route-path, a lateral position C0' of the correction route-path, an attitude angle C1' thereof and a curvature C2' thereof each with respect to the host vehicle 10 are calculated by following Expression (8), Expression (9) and Expression (10).

Figure 8:
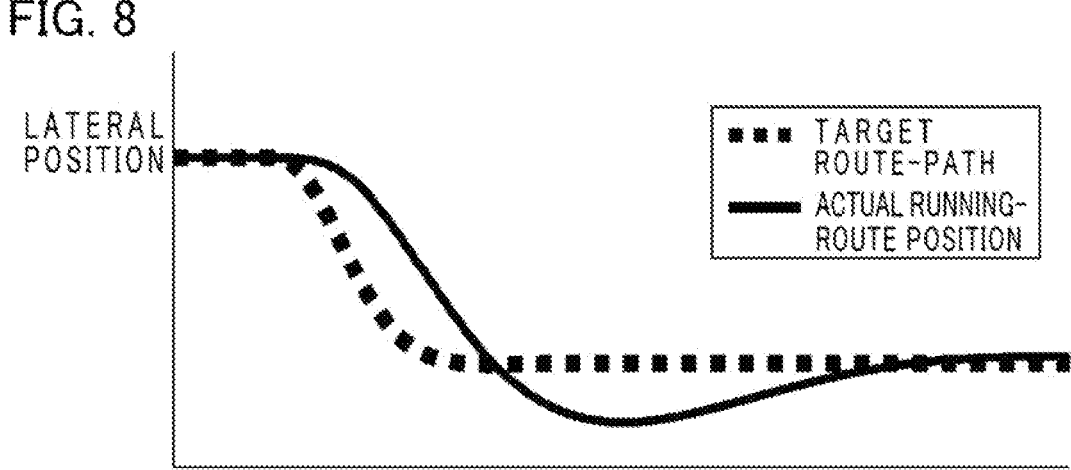
FIG. 8 is a diagram showing simulation results of the operations of the travel assistance control device that is provided with the path generation device according to Embodiment 1 in the running scene of FIG. 5.
Figure 8:
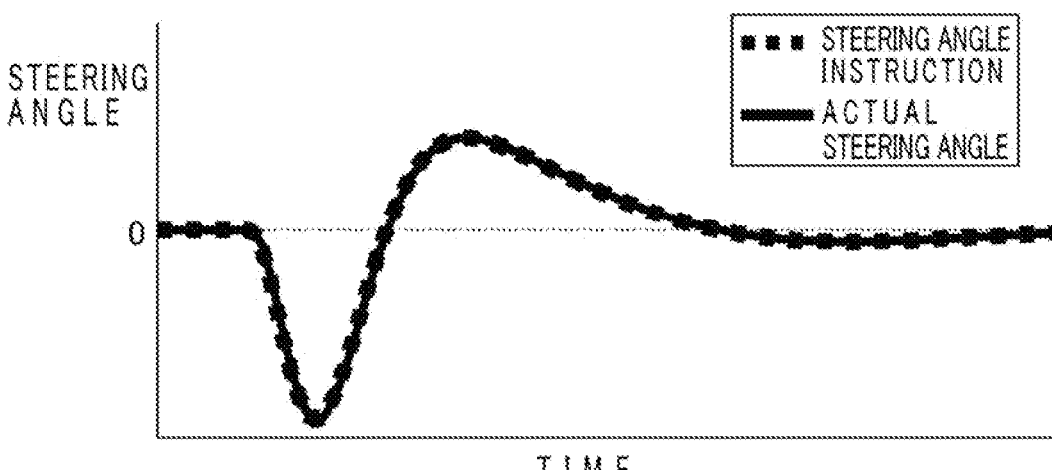

[Expression Figure-8]

$$C0' = C0 + y_{flt} \tag{8}$$

Figure 9:
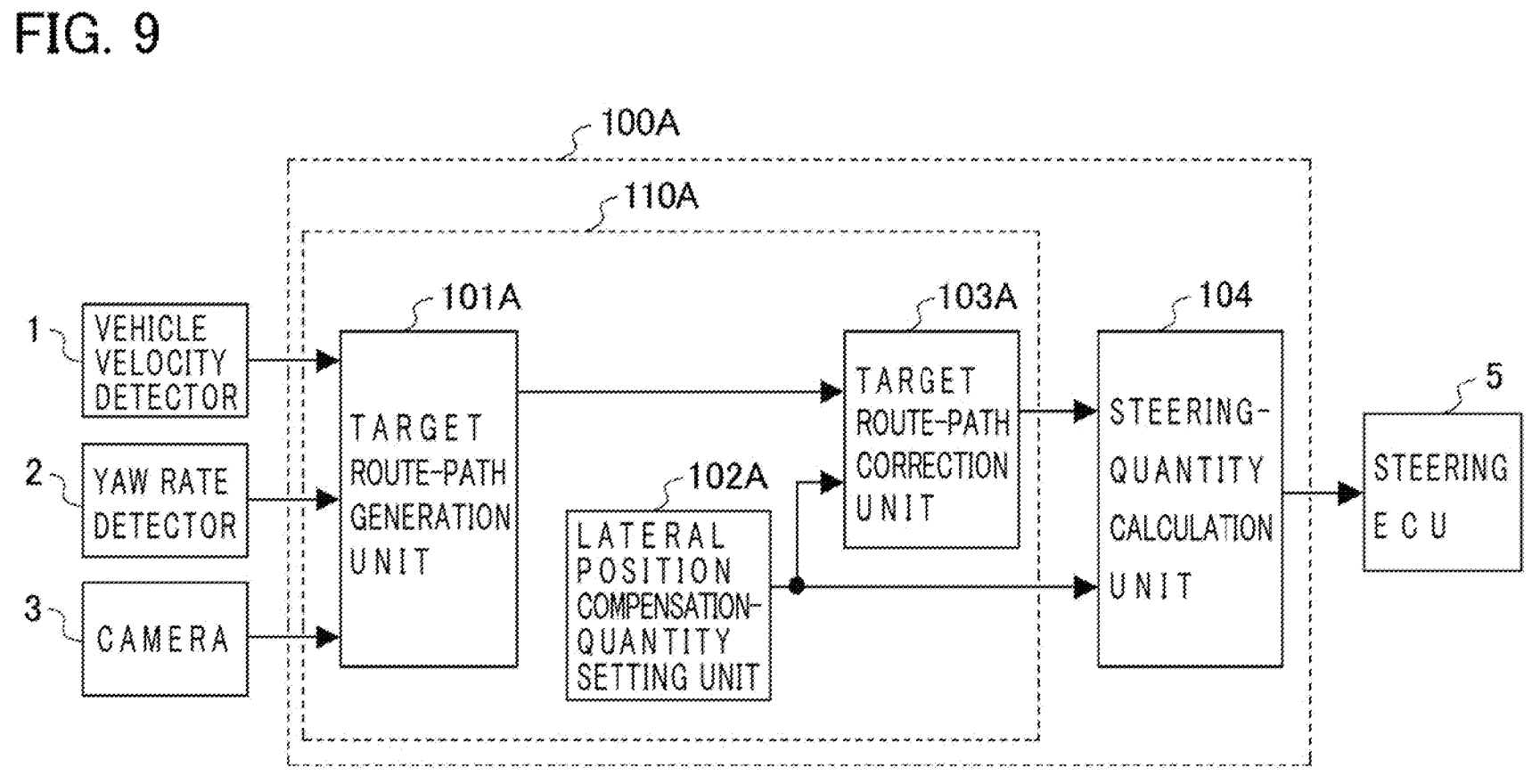

[Expression Figure-9]

$$C1' = C1 + \frac{v_{y flt}}{V} \tag{9}$$

Figure 10:
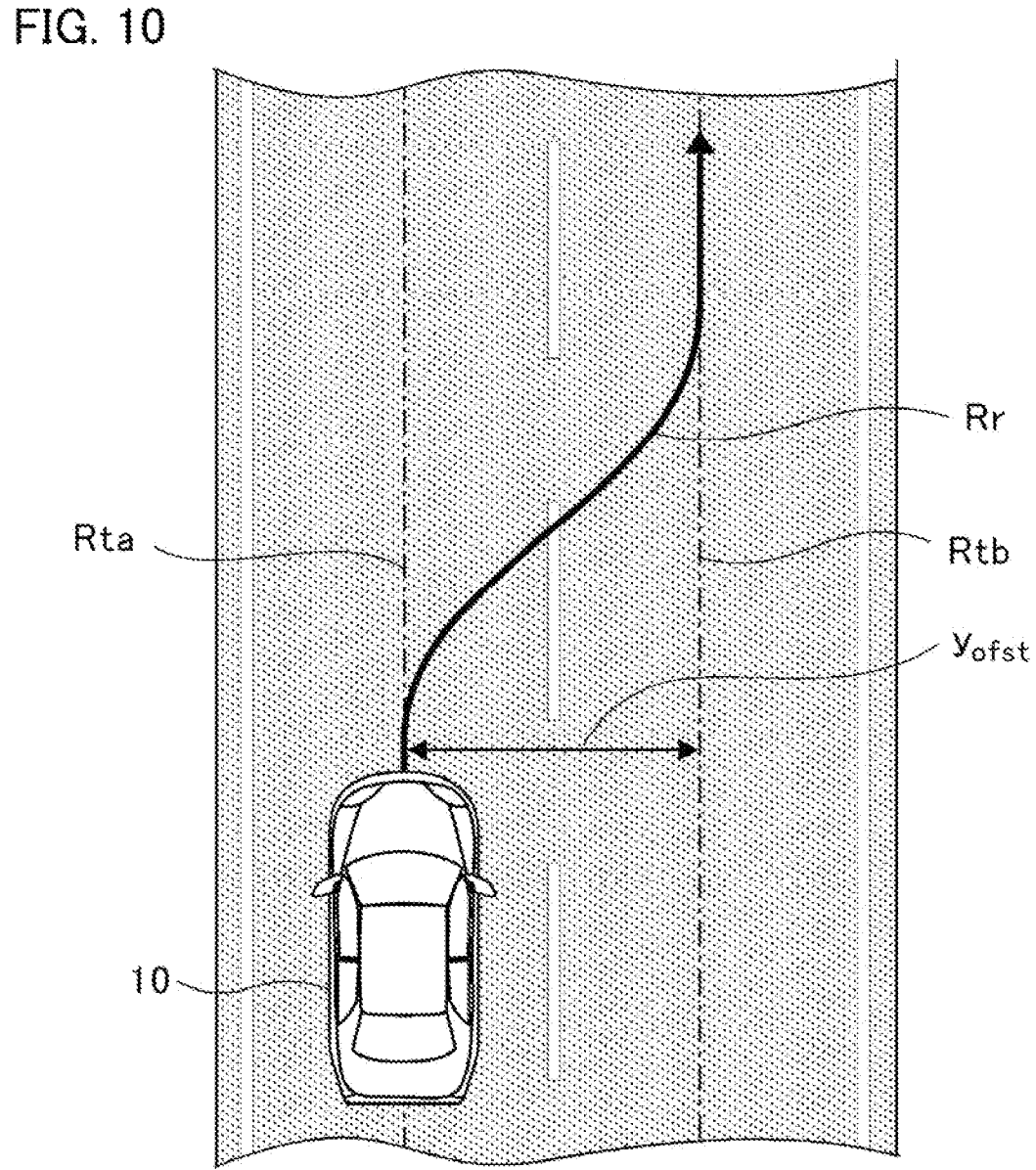
FIG. 10 is a diagram illustrating, by way of example, a running scene which becomes a controlled object of the travel assistance control device in its modification example of Embodiment 1.

[Expression Figure-10]

$$C2' = C2 + \frac{a_{y flt}}{V^2} \tag{10}$$

In Expressions (9) and (10), parameter V designates a vehicle velocity of the host vehicle 10.

As for a filter Fdref(s), a second-order low-pass filter given by following Expression (11) is used, for example. Parameter $\zeta$ is an attenuation coefficient; and parameter ωn, a frequency.

Figure 11:
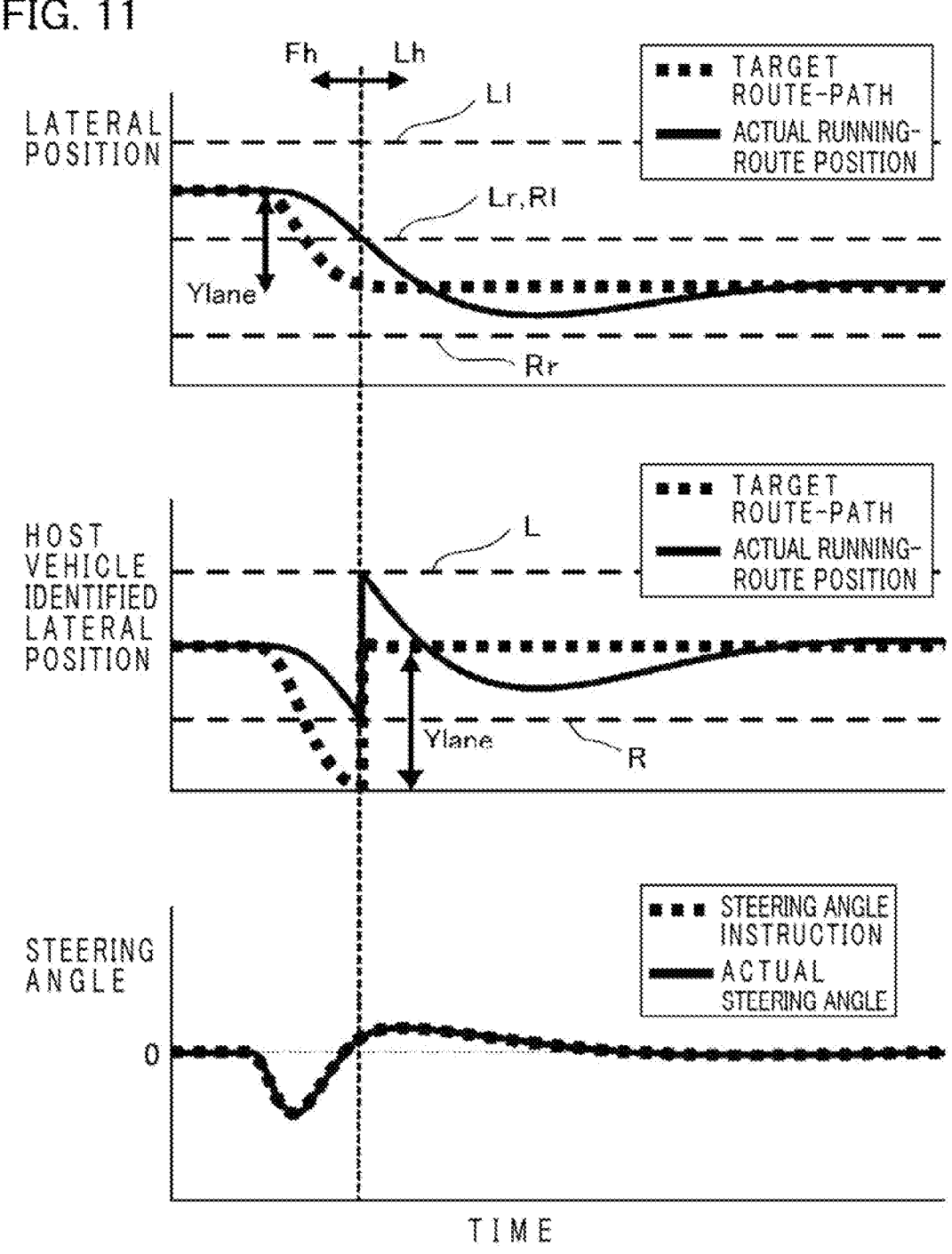
FIG. 11 is a diagram showing simulation results of the operations of the travel assistance control device being the modification example of Embodiment 1.

[Expression Figure-11]

$$F_{dref}(s) = \frac{\omega_n^2}{s^2 + 2\zeta s + \omega_n^2} \tag{11}$$

For the filter Fdref(s), a moving-average filter may be used. Following Expression (12) gives a moving-average filter of a time constant $\tau$.

Figure 12:
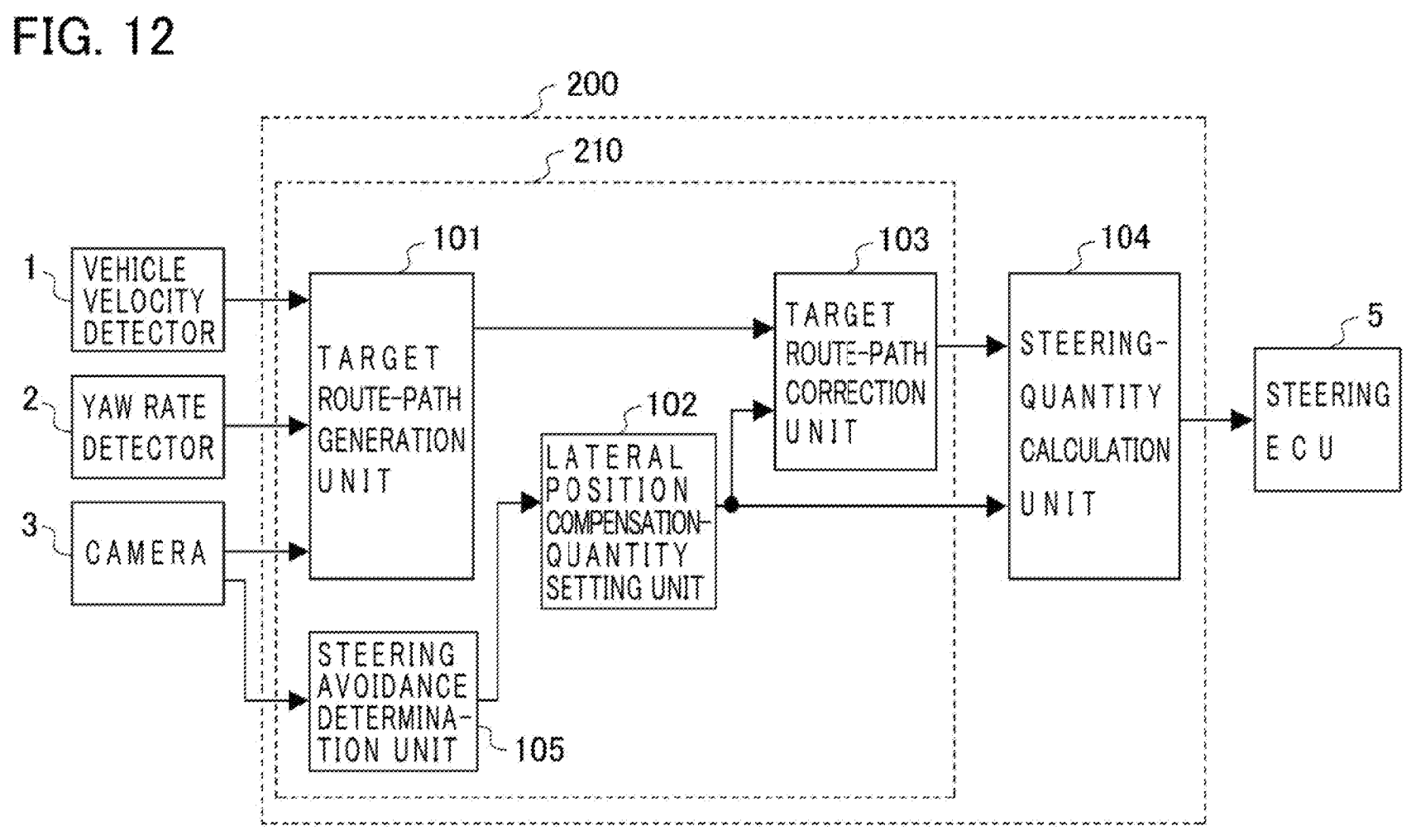

[Expression Figure-12]

$$F_{dref}(s) = \frac{1}{\tau} \frac{1 - \exp(-\tau s)}{s} \tag{12}$$

As for a filter Fdref(s), it may be used that a Padé approximant is applied to the moving-average filter of Expression (12). A second-order Padé approximant is given by following Expression (13).

Figure 13:
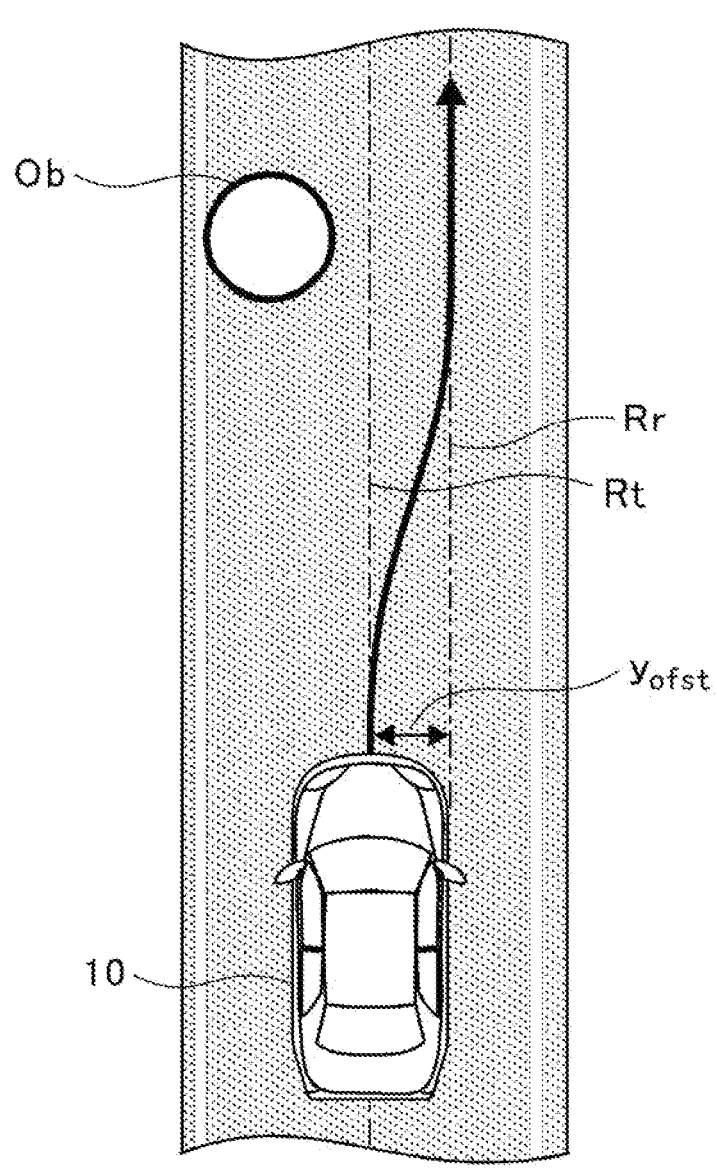
FIG. 13 is a diagram illustrating, by way of example, a running scene which becomes a controlled object of the travel assistance control device according to Embodiment 2.

[Expression Figure–13]

$$\exp(-\tau s) \approx \frac{1 - \dfrac{\tau s}{2} + \dfrac{(\tau s)^2}{12}}{1 + \dfrac{\tau s}{2} + \dfrac{(\tau s)^2}{12}} \tag{13}$$

A moving-average filter for which the second-order Padé approximant is applied is given by following Expression (14).

Figure 14:
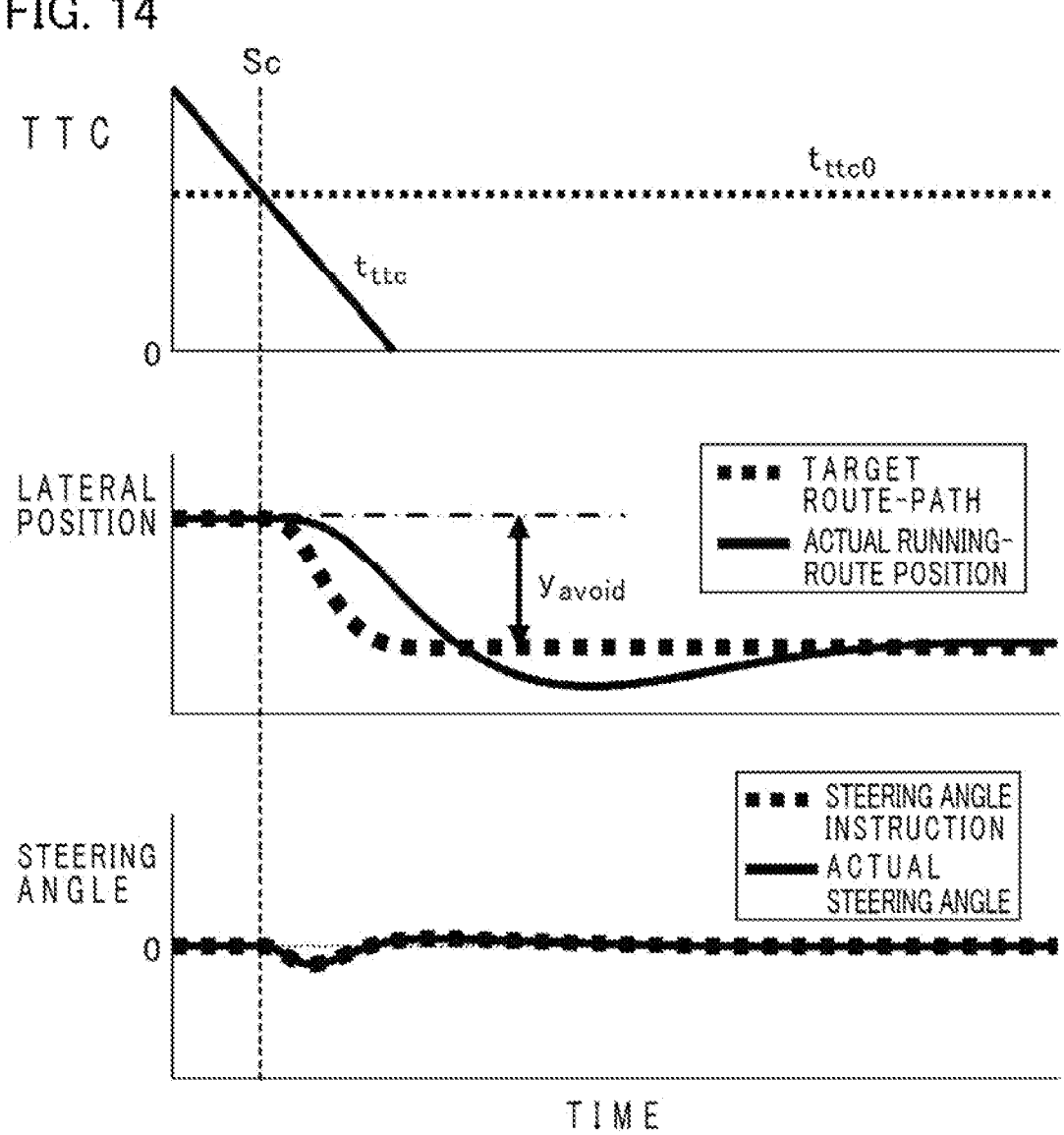
FIG. 14 is a diagram showing simulation results in the running scene which becomes a controlled object of the travel assistance control device according to Embodiment 2.

[Expression Figure–14]

$$F_{dref}(s) = \frac{\dfrac{12}{\tau^2}}{s^2 + \dfrac{6}{\tau}s + \dfrac{12}{\tau^2}} \tag{14}$$

As for the filter Fdref(s), a two-stage moving-average filter in which two of moving-average filters are combined or cascaded may be used. Following Expression (15) gives a transfer function in which two moving-average filters of time constants $\tau 1d$ and $\tau 2d$ each are cascaded.

Figure 15:
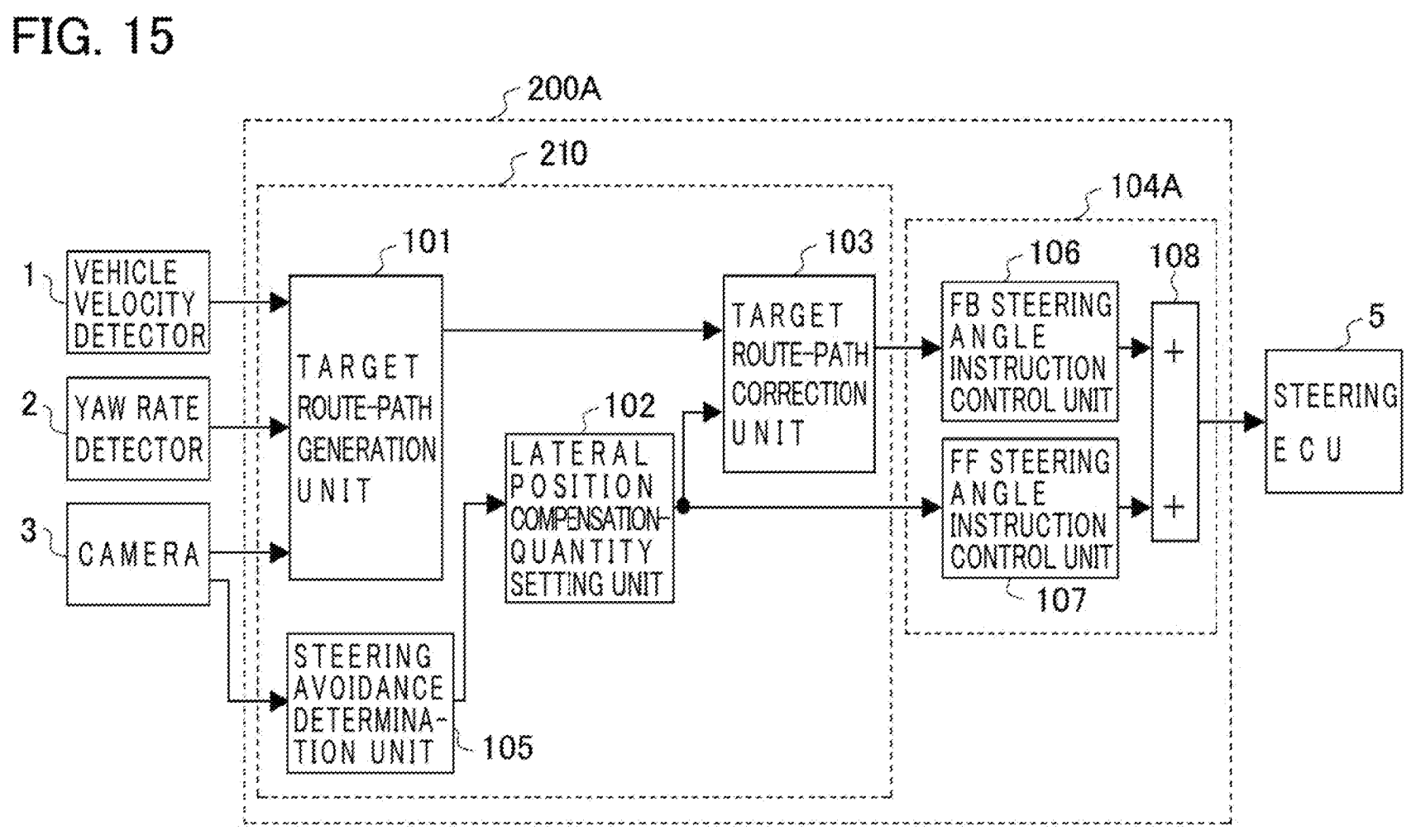

[Expression Figure–15]

$$F_{dref}(s) = \left[\frac{\dfrac{12}{\tau_{1d}^2}}{s^2 + \dfrac{6}{\tau_{1d}}s + \dfrac{12}{\tau_{1d}^2}}\right]\left[\frac{\dfrac{12}{\tau_{2d}^2}}{s^2 + \dfrac{6}{\tau_{2d}}s + \dfrac{12}{\tau_{2d}^2}}\right] \tag{15}$$

The steering-quantity calculation unit 104 calculates a steering angle command $\delta^*$ on the basis of a lateral position C0' of a correction route-path, on that of an attitude angle C1' thereof and on that of the curvature C2' thereof, and on the basis of a vehicle velocity V and on that of a yaw rate $\gamma$ego.

The lateral position deviation ye, a yaw angle deviation re and a yaw rate deviation $\gamma$e are calculated by the following Expression (16), Expression (17) and Expression (18), by using respective Expressions (8) of the correction route-path, (9) thereof and (10) thereof, and using a vehicle velocity V of the host vehicle 10 and a yaw rate $\gamma$ego thereof.

Figure 16:
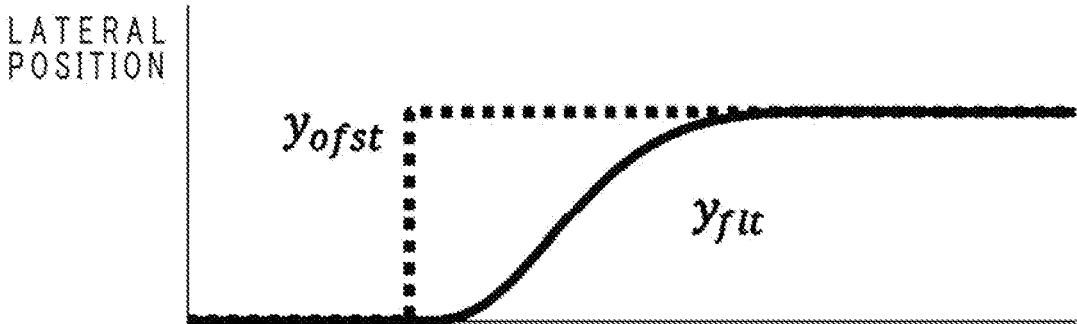
FIG. 16 is a diagram for explaining the operations of the travel assistance control device according to Embodiment 3.
Figure 16:
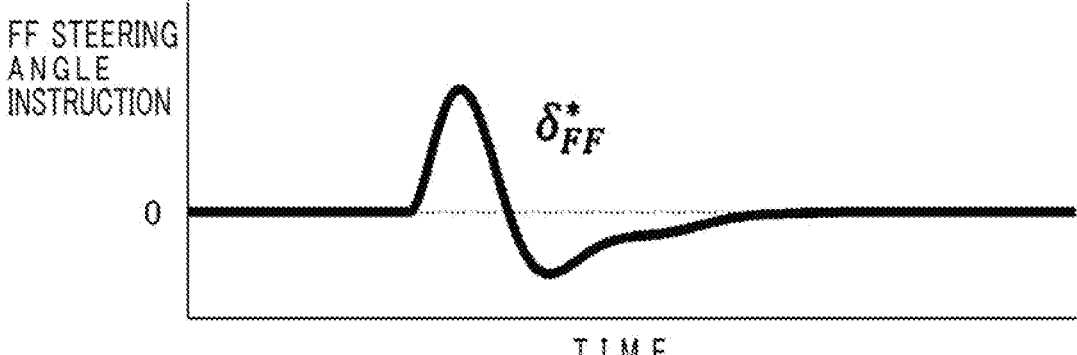

[Expression Figure-16]

$$y_e = C0' \tag{16}$$

Figure 17:
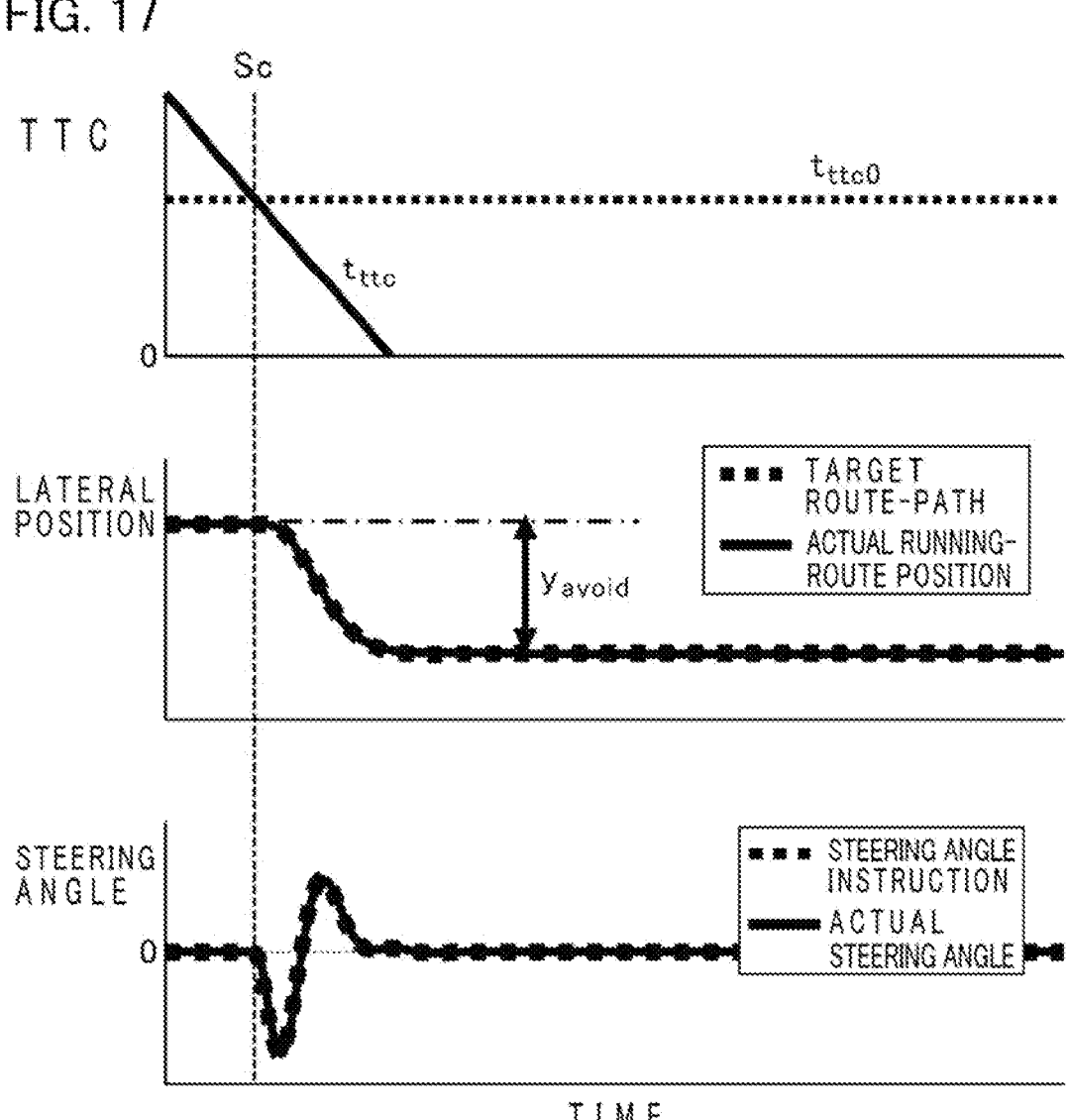
FIG. 17 is a diagram showing simulation results in a running scene which becomes a controlled object of the travel assistance control device according to Embodiment 3.

[Expression Figure-17]

$$r_e = C1' \tag{17}$$

[Expression Figure-18]

$$\gamma_e = C2' \times V - \gamma_{ego} \tag{18}$$

The steering angle command $\delta^*$ is specifically calculated by following Expression (19). In Expression (19), parameters Ki (i=1, 2, and 3) designate control gains each.

[Expression Figure-19]

$$\delta^*_{FB} = K1 \times y_e + K2 \times r_e + K3 \times \gamma_e \tag{19}$$

Next, the explanation will be made for a running-route assistance control, by way of example, according to an actual and specific running scene. FIG. 5 is an example of a running scene of Embodiment 1, which illustrates a position of a motor vehicle at the instant when its running-route assistance control starts.

First, in FIG. 5, in a case in which a conventional running-route assistance control having no modification nor correction route-path, a control is started in a state in which there exists a sideward or lateral position deviation "ye" with respect to a target route-path. Under the conditions of FIG. 5, shown in FIG. 6 are results in which the simulation has been performed in an example of the conventional case where there does not exist a correction route-path. In the case of FIG. 6, when a control on a steering angle command is performed as of Expression (19), the control is started in a state in which there exists the lateral position deviation "ye," so that the control starts on the steering angle command which is larger by the amount of a compensation-term of lateral deviation corresponding to the first term of Expression (19). In addition, in the case where there exists no modification nor correction route-path, the target route-path always becomes in parallel with respect to a road, so that, due to a yaw angle deviation "re" and a yaw rate deviation "$\gamma$e," the respective second term of Expression (19) and the respective third term thereof give the steering angle command so as to suppress the steering. According to the manner described above, an actual steering angle of a motor vehicle cannot follow up the steering angle command at the time of starting up the running-route assistance control, and also the actual steering angle becomes gradual; and thus, as a result, the convergence of lateral position deviation of the motor vehicle also becomes gradual.

Next, when a motor vehicle on which the travel assistance control device 100 provided with the path generation device 110 of Embodiment 1 and with the steering-quantity calculation unit 104 thereof is mounted starts a running-route assistance control from a motor vehicle's position as illustrated in FIG. 5, a lateral position deviation is produced with respect to a target route-path Rt when the center of vehicle lane produced as the target route-path Rt by the target route-path generation unit 101. At this time, the lateral position compensation-quantity setting unit 102 outputs a "step input" which is set to take on quantities from an initial value of the lateral deviation at the time of starting the running-route assistance control to the quantity of zero (0), as a lateral position compensation-quantity yofst.

Here, as an example of the operations of the target route-path correction unit 103, in a case in which a correction route-path Rr is produced so that the correction route-path converges from its lateral position deviation of 1.0 [m] toward its lateral position deviation of 0 [m] after 2.0 [s] from the control start, time constants are set, for example, as $\tau 1d = \tau 2d = 1.0$ [s] so that, by using the two-stage moving-average filter, a total sum of these time constants $\tau 1d$ and $\tau 2d$ becomes at the 2.0 [s].

At this time, filter responses are given as shown in FIG. 7, at a time when a lateral position compensation-quantity yofst is inputted. Operation characteristics shown at the first level (upper-row stage) of FIG. 7 indicate a time history of the lateral position compensation-quantity yofst and that of a targeted lateral position yflt. Operation characteristics shown at the second level (middle-row stage) of the same figure indicate a time history of a targeted lateral velocity vyflt. Operation characteristics shown at the third level (lower-row stage) thereof indicate a time history of a targeted lateral acceleration ayflt. According to these operations, it is indicated that a correction route-path Rr can be produced by which the deviation to a target route-path Rt is made to converge to zero (0) from a lateral position of a motor vehicle after 2.0 [s] from a time of starting its control.

In addition, in the steering-quantity calculation unit 104, a steering angle command is controlled, on the basis of a correction route-path having been calculated by the filter, so that a correction route-path Rr is followed up along it in accordance with Expression (19).

FIG. 8 shows an example in a case in which the assistance control is performed by using a correction route-path in the embodiment. In a case of FIG. 6, an actual steering angle of a motor vehicle cannot follow up a steering angle command, and, as a result, the convergence of lateral position deviation has also been gradual, whereas, in a case in which the correction route-path is used, a steering angle command changes continuously from a time of starting the control, and an actual steering angle can also be controlled so as to follow up the steering angle command as shown in FIG. 8; and thus, it becomes possible to control so as to make a lateral deviation converge to a modified target route-path Rt.

As described above, in Embodiment 1, the lateral position compensation-quantity setting unit outputs a step input taking on quantities from a first lateral position compensation-quantity to a second lateral position compensation-quantity as the aforementioned lateral position compensation-quantity. And then, the target route-path correction unit calculates a lateral velocity compensation-value being a differential value of a lateral position compensation-quantity and a lateral acceleration compensation-value being a differential value of a lateral velocity compensation-value, when the convergence from the first lateral position compensation-quantity to the second lateral position compensation-quantity is made, and modifies a lateral position, an attitude angle and the curvature which constitute a target route-path, on the basis of the lateral position compensation-quantity, the lateral velocity compensation-value and the lateral acceleration compensation-value, respectively.

In addition, in the lateral position compensation-quantity setting unit, the first lateral position compensation-quantity is set at an initial value of lateral deviation at a time of starting a running-route assistance control, and the second lateral position compensation-quantity is set at zero (0).

As explained above, in Embodiment 1, a target route-path is modified on the basis of a lateral position compensation-quantity being independently set with respect to the target route-path calculated from information of a host vehicle and that of a road(s), whereby, in a case in which the control is performed so that the correction route-path is made coincident with a running route-path of the host vehicle each other, it is possible to calculate a continuous steering angle command, which has not been possible in a case in which conventionally there exists no correction route-path. For this reason, it becomes possible to run the motor vehicle so that it follows up along the correction route-path.

Modification Example of Embodiment 1

FIG. 9 is a functional block diagram illustrating a configuration of a path generation device 110A and that of a running-route or travel assistance control device 100A which are each a modification example of Embodiment 1. In the modification example, the explanation will be made, by way of example, for a case in which the path generation device 110A is effectively applied to a vehicle lane change. FIG. 9 illustrates the configuration of the path generation device in which the lateral position compensation-quantity setting unit 102 of FIG. 2 is changed to a lateral position compensation-quantity setting unit 102A, and the target route-path correction unit 103 thereof, changed to a target route-path correction unit 103A.

In the lateral position compensation-quantity setting unit 102A, a lateral position compensation-quantity yofst is calculated as given by next Expression (20), by defining a time at a time of starting a vehicle lane change as the time "t=0."

[Expression Figure–20]

$$y_{ofst} = \begin{cases} 0 & (t \le 0) \\ Y_{lane} & (t > 0) \end{cases} \tag{20}$$

Parameter Ylane designates a sideward or lateral shift-movement amount toward an adjacent vehicle lane, namely, a vehicle lane's width. When a motor vehicle moves to shift toward a left adjacent vehicle lane, the parameter Ylane is calculated as given by following Expression (21) by using parameters C0LR and C0LL which are a left-hand side position of a white coat-line on the left adjacent vehicle lane, and a right-hand side position thereof. Similarly, when a motor vehicle moves to shift toward a right adjacent vehicle lane, the parameter Ylane is calculated as given by following Expression (22) by using parameters C0RR and C0RL which are a left-hand side position of a white coat-line on the right adjacent vehicle lane, and a right-hand side position thereof.

[Expression Figure–21]

$$Y_{lane} = \frac{C0_{LR} + C0_{LL}}{2} - \frac{C0_R + C0_L}{2} \tag{21}$$

[Expression Figure–22]

$$Y_{lane} = \frac{C0_{RR} + C0_{RL}}{2} - \frac{C0_R + C0_L}{2} \tag{22}$$

In the target route-path correction unit 103A, a correction route-path is produced on the basis of a lateral position compensation-quantity yofst having been set by the lateral position compensation-quantity setting unit 102A. A lateral position C0' correction route-path with respect to the host vehicle 10, a targeted lateral velocity vyflt thereof and a targeted lateral acceleration ayflt thereof in the first half of a vehicle lane change (from a start-up to a departure of the vehicle lane itself) are similar to Expressions (5), (6) and (7) in Embodiment 1. A targeted lateral position yflt of a correction route-path in the latter half of the vehicle lane change (from the departure of the vehicle lane itself to the arrival at the center of an adjacent vehicle lane) is calculated as given by next Expression (23).

[Expression Figure-23]

$$C0'=C0+y_{flt}-Y_{lane} \tag{23}$$

Next, according to an example of an actual and specific running scenes the explanation will be made for operational contents of a vehicle lane change by means of the path generation device 110A and the steering-quantity calculation unit 104.

FIG. 10 shows an example of a running scene in the modification example of Embodiment 1, and illustrates a position of a motor vehicle at the instant when it starts a vehicle lane change from a left vehicle lane toward a right vehicle lane. FIG. 11 shows simulation operations at those times. The lateral position compensation-quantity setting unit 102A outputs, as a lateral position compensation-quantity yofst, a "step input" being set to take on quantities from the quantity of zero (0) corresponding to the center of a current vehicle lane, namely, from a target route-path Rta before a vehicle lane change to a target route-path Rtb after the vehicle lane change corresponding to the center of a vehicle lane, i.e., right adjacent vehicle lane. And then, the target route-path correction unit 103A outputs a correction route-path Rr for moving to shift from the current vehicle lane center toward the vehicle lane center of the right adjacent vehicle lane. According to this arrangement, the steering-quantity calculation unit 104 can calculate a steering angle command for the vehicle lane change.

Here, in the first half of a vehicle lane change (from a start-up to a departure of the vehicle lane itself) Fh, the host vehicle 10 identifies a left vehicle lane's left white coat-line Ll as a left white coat-line L, and identifies a left vehicle lane's right white coat-line Lr as a right, white coat-line R, so that a lateral position C0' of a correction route-path with respect to the host vehicle 10 is acquired by Expression (8). Meanwhile, in the latter half of the vehicle lane change (from the departure of the vehicle lane itself to the arrival at the center of the adjacent vehicle lane) Lh, the host vehicle 10 identifies a right vehicle lane's left white coat-line Rl as a left white coat-line L, and identifies a right vehicle lane's right white coat-line as a right white coat-line R, so that a lateral position C0' of a correction route-path with respect to the host vehicle 10 is given by Expression (23). The first level (upper-row stage) of FIG. 11 indicates a time history of lateral positions of the host vehicle 10 with respect to each vehicle lane. The second level (middle-row stage) of the same figure indicates a time history of lateral positions with respect to each vehicle lane, where the host vehicle 10 identifies them with respect to the white coat-lines. The third level (lower-row stage) indicates a time history of a steering angle command being calculated, and that of an actual steering angle. Note that, the parameter Ylane indicated at the first level (upper-row stage) of FIG. 11 and at the second level (middle-row stage) thereof corresponds to a lateral shift-movement amount toward the adjacent vehicle lane, namely, a vehicle lane's width.

In the modification example of Embodiment 1 described above, a first lateral position compensation-quantity is set at zero (0) in the lateral position compensation-quantity setting unit, and its second lateral position compensation-quantity is set at a lateral shift-movement amount for performing a vehicle lane change toward an adjacent vehicle lane.

As explained above, in the modification example of Embodiment 1, a target route-path is modified so as to move from a current vehicle lane center toward the vehicle lane center of an adjacent vehicle lane with respect to the target route-path calculated from information of a host vehicle and that of a road(s), whereby it becomes possible to calculate a steering angle command(s) for performing the vehicle lane change.

It should be noted that, in the modification example of Embodiment 1, the explanation has been made for an example of path generation at a time of performing a vehicle lane change; however, by using the configuration, it is also possible to similarly apply to path generation in such a manner of departing from the main vehicle lane. For example, a lateral shift-movement amount toward a roadside is set at a second lateral position compensation-quantity in the lateral position compensation-quantity setting unit 102A, whereby the technologies of the embodiments can be applied to a case of retracting toward a roadside and/or to a case of also moving to shift toward a roadside for the purpose of picking up or discharging a passenger(s).

Embodiment 2

FIG. 12 is a functional block diagram for explaining a path generation device 210 of a motor vehicle and a running-route or travel assistance control device 200 thereof according to Embodiment 2.

The path generation device 210 comprises the target route-path generation unit 101, the lateral position compensation-quantity setting unit 102, the target route-path correction unit 103 and a steering avoidance determination unit 105.

The path generation device 210 according to Embodiment 2 is a device in which the steering avoidance determination unit 105 is added to the path generation device 110 according to Embodiment 1.

The steering avoidance determination unit 105 determines, by defining as its input obstacle information in the front from the camera 3, whether or not an obstacle is to be avoided by the steering, and outputs a sideward or lateral avoidance amount at a time when the determination is established.

The lateral position compensation-quantity setting unit 102 determines, on the basis of an input of the lateral avoidance amount, a lateral position compensation-quantity of target route-path, which is inputted into the target route-path correction unit 103 and into the steering-quantity calculation unit 104.

The target route-path correction unit 103 modifies, on the basis of the lateral position compensation-quantity, a target route-path having been calculated by the target route-path generation unit 101, so that modified route-path information is inputted into the steering-quantity calculation unit 104. The steering-quantity calculation unit 104 produces, on the basis of a correction route-path, a steering angle command δ*, which is inputted into the steering ECU 5.

The explanation will be made for the specific operations of the path generation device 210 according to Embodiment 2.

The steering avoidance determination unit 105 performs determination on the necessity of avoidance steering on both of the conditions in a vertical or frontal direction, and in a lateral or sideward direction, on the basis of inputs each of a relative frontal position χrel of a front obstacle identified by means of a sensor(s) such as a camera, radar or the like with respect to a host vehicle, a relative lateral position yobj therewith, a lateral width wobj of the obstacle and a relative velocity vrel therewith, and on the basis of a vehicle's width wego of the host vehicle and on that of an avoidance margin quantity or avoidance margin quantities, ymarge, thereof each stored in the storage device 1001 in advance, so that it is determined that avoidance-steering determination is established at a time when both of the conditions in the direction are met. In addition, a lateral shift-movement amount yavoid required to perform the lateral avoidance is outputted at the time when the avoidance-steering determination is established.

First, the explanation will be made for a determination condition on the necessity of avoidance steering in a vertical or frontal direction with respect to an obstacle. On the basis of a time-to-collision margin tttc of a host vehicle with respect to an obstacle and in a case in which the time-to-collision margin tttc goes below a threshold value of the time-to-collision margin, tttc0, being set in advance, a step input of a step amount (lateral shift-movement amount) yavoid is outputted as a lateral position compensation-quantity yofst, where a host vehicle's lateral position in that case is defined as an initial value of the quantity.

A time-to-collision margin tttc is given by following Expression (24) by using a relative position $\chi$rel between an obstacle and a host vehicle, and a relative velocity vrel therebetween.

[Expression Figure–24]

$$t_{ttc} = \frac{x_{rel}}{V_{rel}} \tag{24}$$

Next, the explanation will be made for a determination condition on the necessity of avoidance steering in a lateral or sideward direction. On determination in the sideward direction, the determination is performed whether the possibility of collision at a time when a position of an obstacle is to be reached, on the basis of inputs each of a relative lateral position yobj of the obstacle and on that of a lateral width wobj thereof, and on the basis of a vehicle's width wego of the host vehicle and on that of an avoidance margin quantity ymarge thereof each stored in the storage device 1001 in advance.

A determination condition in the sideward direction is given by following Expression (25).

[Expression Figure–25]

$$|y_{obj}| < \frac{w_{obj}}{2} + \frac{w_{ego}}{2} + y_{marge} \tag{25}$$

At a time when the determination is established, a lateral shift-movement amount yavoid required to run by laterally avoiding an obstacle is calculate, and then is outputted. The avoidance may be come up with both the directions toward a left-hand direction or right-hand one, so that the lateral shift-movement amount yavoid is calculated by following Expression (26).

[Expression Figure–26]

$$y_{avoid} = y_{obj} \pm \left( \frac{w_{obj}}{2} + \frac{w_{ego}}{2} + y_{marge} \right) \tag{26}$$

On the basis of an input of lateral shift-movement amount yavoid inputted into the lateral position compensation-quantity setting unit 102, the lateral position compensation-quantity setting unit outputs a "step input" of lateral shift-movement amount yavoid as a lateral position compensation-quantity yofst, in a case in which the lateral shift-movement amount yavoid is inputted as a nonzero value, by defining a host vehicle's lateral position in that case as an initial value of the quantity.

Next, according to an example of actual and specific running scene, the explanation will be made for operational contents of the travel assistance control device 200 in Embodiment 2.

FIG. 13 illustrates an example of a running scene according to the travel assistance control device 200. In FIG. 13, the running scene is illustrated in which there exists an obstacle Ob in front of a motor vehicle in its running route-path, and it is feared that the motor vehicle will collide if it continues its running along the original running route-path. FIG. 13 is an example in which the motor vehicle (host vehicle) 10 on its way to run along a target route-path Rt runs on a correction route-path Rr to avoid the obstacle Ob.

FIG. 14 shows simulation results of the running scene in FIG. 13. The solid line at the first level (upper-row stage) of FIG. 14 indicates a time-to-collision margin tttc to an obstacle, and the dotted line, a threshold value of the time-to-collision margin, tttc0. The solid line at the second level (middle-row stage) thereof indicates an actual running-route position of a motor vehicle, and the dotted line, a target route-path. The solid line at the third level (lower-row stage) thereof indicates an actual steering angle, and the dotted line, a steering angle command.

The steering avoidance determination unit 105 performs determination on the necessity of avoidance steering on both of the conditions in a vertical or frontal direction, and in a lateral or sideward direction; however, in the running scene of FIG. 13, a condition in the sideward direction is always established before performing the avoidance, so that condition in the frontal direction is taken into consideration herein. The solid line at the first level (upper-row stage) of FIG. 14 shows an appearance in which a time-to-collision margin tttc to an obstacle decreases concurrently with time; and so, a condition in a frontal direction with respect to the obstacle is met when a threshold value of the time-to-collision margin, tttc0, indicated by the dotted line is reached or less than it, so that the steering avoidance determination unit 105 outputs a lateral shift-movement amount yavoid corresponding to a lateral avoidance amount. At this time, the lateral position compensation-quantity setting unit 102 outputs, as a lateral position compensation-quantity yofst, a step input of lateral shift-movement amount yavoid by defining a current lateral position of the host vehicle as an initial value of the quantity. As for the target route-path correction unit 103, a total sum of time constants τ1d and τ2d of a two-stage moving-average filter is set so that the threshold value of the time-to-collision margin, tttc0, is reached or less than it. As for a transfer characteristic F(s) of the two-stage moving-average filter as defined in the manner described above, a correction route-path for laterally shifting is produced by the lateral shift-movement amount yavoid required to avoid the obstacle within the threshold value of the time-to-collision margin, tttc0, from a step time of the lateral position compensation quantity yofst. From that time onward, the steering-quantity calculation unit 104 gives a steering angle command(s) so as to follow up along the correction route-path having been produced.

As described above, in the lateral position compensation-quantity setting unit in Embodiment 2, a first lateral position compensation-quantity is set at zero (0), and a second lateral position compensation-quantity is set at a lateral shift-movement amount for avoiding a front obstacle.

As explained above, in Embodiment 2, the path generation device 210 produces a correction route-path for avoiding a collision when determination is performed so that it is feared to come into collision with an obstacle; and so, it becomes possible to perform avoidance steering by means of the steering-quantity calculation unit 104.

Embodiment 3

FIG. 15 illustrates a functional block diagram of a running-route or travel assistance control device 200A according to Embodiment 3. Note that, the functions other than a steering-quantity calculation unit 104A are equivalent or similar to those in Embodiment 2, and thus their explanation will be omitted.

The steering-quantity calculation unit 104A according to Embodiment 3 is constituted of an FB (feedback) steering angle command control unit 106, an FF (feedforward) steering angle command control unit 107, and a steering angle command summing unit 108.

In the FB steering angle command control unit 106, an FB steering angle command δFB* is calculated by taking into a correction route-path as its input, for example, as given by Expression (19) of Embodiment 1, so that the FB steering angle command δFB* is outputted.

In the FF steering angle command control unit 107, an FF steering angle command δFF* is calculated by taking into a lateral position compensation-quantity yofst as its input, on the basis of a transfer characteristic of the target route-path correction unit 103 and on that of an inverse transfer function of a motor vehicle's motion model, so that the FF steering angle command δFF* is outputted.

In the steering angle command summing unit 108, the FB steering angle command δFB* and the FF steering angle command δFF* are added to each other, whereby a total sum is inputted into the steering ECU 5 as a steering angle command δ*.

Next, the explanation will be made for specific operational contents of the FF steering angle command control unit 107.

As for a motor vehicle's motion model, used are, for example, a steady-state cornering or turning model being a steering angle responsivity at a time of making a steady-state circular turn, and/or a two-wheel model or the like in which sideward or lateral motion of a motor vehicle and yaw rotational motion thereof are approximated to a two-wheeled automotive vehicle.

When consideration is given to a steady-state turning model, it is known that, from a front-wheel tire angle δf, a transfer function G(s) on a lateral position y can be given by following Expression (27), Expression (28) and Expression (29).

[Expression Figure−27]

$$y = G(s)\delta_f \qquad (27)$$

[Expression Figure−28]

$$G(s) = \frac{1}{s^2} \cdot \frac{V^2}{(1 + AV^2)l} \qquad (28)$$

[Expression Figure−29]

$$A = -\frac{m}{2l^2} \cdot \frac{l_f K_f - l_r K_r}{K_f K_r} \qquad (29)$$

In Expression (28) and Expression (29), symbol "s" designates a Laplacian operator. Parameter A designates a stability factor of a motor vehicle. Parameter m designates the mass of the motor vehicle. Parameter l designates a wheel base of the motor vesicle. Parameter lf designates the distance between the center of gravity of the motor vehicle and its front wheel's shaft. Parameter lr designates the distance between the center of gravity of the motor vehicle and its rear wheel's shaft. Parameter Kf designates front wheel's cornering power of the motor vehicle. Parameter Kr designates rear wheel's cornering power of the motor vehicle. These parameters are stored in the storage device 1001 in advance. Moreover, when consideration is given to the two-wheel model, it is known that, from a front-wheel tire angle δf, a transfer function G(s) on a lateral position y can be given by following Expression (30) and Expression (31).

[Expression Figure−30]

$$G(s) = \frac{1}{s^2} \cdot \frac{V^2}{(1 + AV^2)l} \cdot \frac{\frac{I}{2lK_r}S^2 + \frac{l_r}{V}S + 1}{\frac{s^2}{\omega_n^2} + \frac{2\zeta s}{\omega_n} + 1} \qquad (30)$$

[Expression Figure−31]

$$\omega_n = \frac{2l}{V}\sqrt{\frac{K_f K_r}{ml}}\sqrt{1 + AV^2}, \ \zeta = \frac{m(l_f^2 K_f + l_r^2 K_r) + I(K_f + K_r)}{2l\sqrt{mlK_f K_r(1 + AV^2)}} \qquad (31)$$

In Expressions (30) and (31) each, parameter "I" designates yaw inertia moment.

In order to give a steering angle so that a motor vehicle follows up with respect to a correction route-path, a transfer characteristic from a lateral position compensation-quantity yofst up to an FF steering angle command δFF* can be given by following Expression (32) by using a transfer characteristic F(s) of the target route-path correction unit 103 and an inverse transfer function G^(−1)(s) of the aforementioned motor vehicle's motion model.

[Expression Figure-32]

$$\delta^*_{FF} = F(s)G^{-1}(s)y_{ofst} \qquad (32)$$

In accordance with the calculation contents described above, when a correction route-path is calculated by using a filter of a transfer characteristic F(s) from a lateral position compensation-quantity as an example as given at the upper-row stage of FIG. 16, an FF steering angle command δFF* for following up the correction route-path is calculated by Expression (32), which gives as the lower-row stage of FIG. 16.

Here, shown in FIG. 17 are simulation results in a case in which the travel assistance control device 200A of Embodiment 3 is used in the running scene of FIG. 13 similarly to Embodiment 2.

Similarly to FIG. 14, the solid line at the first level (upper-row stage) of FIG. 17 indicates a time-to-collision margin tttc to an obstacle, and the dotted line, a threshold value of the time-to-collision margin, tttc0. The solid line at the second level (middle-row stage) of the same figure indicates an actual running-route position of a motor vehicle, and the dotted line, a target route-path. The solid line at the third level (lower-row stage) of the same figure indicates an actual steering angle, and the dotted line, a steering angle command. The configuration of the path generation device 210 according to Embodiment 3 is equivalent or similar to that in Embodiment 2; and thus, a condition on the obstacle in the frontal direction at the first level (upper-row stage) of FIG. 17 and a modified target route-path at the second level (middle-row stage) of the same figure take on similarly to those of FIG. 14.

Here, the steering-quantity calculation unit 104A calculates in accordance with Expression (32) an FF steering angle command δFF*by taking into a lateral position compensation-quantity yofst as its input, and, by taking into a modified target route-path as its input, adds the FF steering angle command δFF* to an FB steering angle command δFB* calculated by Expression (19), so that a steering angle command δ* is outputted as its output. By adding the FF steering angle command δFF*, the absolute value of steering angle command becomes larger in FIG. 17 in comparison with FIG. 14, so that it is possible to verify that the trackability toward the target route-path is enhanced in response to sharp steering to avoid an obstacle.

As described above, in Embodiment 3, provided is the steering-quantity calculation unit for calculating a target amount of steering for a motor vehicle to run along a correction route-path acquired by the path generation device.

In addition, in the steering-quantity calculation unit, a transfer function model of vehicle's lateral movement or motion from a steering angle of a motor vehicle up to a lateral position of the motor vehicle is provided; and, by using an inverse transfer function of the vehicle's lateral motion and also using a transfer function for calculating a lateral position compensation-quantity in the target route-path correction unit, an FF steering angle command is calculated on the basis of a lateral position compensation-quantity being an output of the lateral position compensation-quantity setting unit, and the FF steering angle command is added to a target amount of steering.

As explained above, in the example of Embodiment 3, an FF steering angle command for following up along a targeted running route-path is calculated by defining as an input a lateral distance required to avoid an obstacle from a current host vehicle's running-route position, and the FF steering angle command is added to an FB steering angle command calculated from a modified target route-path, whereby it is possible to enhance the trackability toward the targeted running route-path.

In the present disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND SYMBOLS

Numeral "100" designates a travel assistance control device; "110," path generation device; "101," target route-path generation unit; "102," lateral position compensation-quantity setting unit; "103," target route-path correction unit; "104," steering-quantity calculation unit; "105," steering avoidance determination unit; "106," FB steering angle command control unit; "107," FF steering angle command control unit; and "108," steering angle command summing unit.

What is claimed is:

1. A vehicle comprising a path generation device and an electric control unit (ECU), wherein the path generation device comprises: a target route-path generator configured to produce a target route-path of a motor vehicle; a lateral position compensation-quantity setting device configured to: output a step input that becomes a first lateral position compensation-quantity before a specific point, jumps from the first lateral position compensation-quantity to a second lateral position compensation-quantity at the specific point, and becomes the second lateral position compensation-quantity after the specific point, and set a value obtained by filtering to the step input as a lateral position compensation-quantity that represents a compensation-quantity in a lateral direction with respect to the target route-path; and a target route-path correction device configured to calculate a correction route-path by correcting the target route-path, wherein the target route-path is expressed by a lateral position, an attitude angle, and a route-path curvature of the target route-path with respect to the motor vehicle, and the correction route-path is expressed by a lateral position, an attitude angle, and a route-path curvature of the correction route-path with respect to the motor vehicle, and wherein the target route-path correction device calculates a targeted lateral velocity by differentiating the lateral position compensation-quantity, calculates a targeted lateral acceleration by differentiating the lateral position compensation-quantity twice, calculates the lateral position of the correction route-path with respect to the motor vehicle by correcting the lateral position of the target route-path with respect to the motor vehicle using the lateral position compensation-quantity, calculates the attitude angle of the correction route-path with respect to the motor vehicle by correcting the attitude angle of the target route-path with respect to the motor vehicle using the targeted lateral velocity, and calculates the route-path curvature of the correction route-path by correcting the route-path curvature of the target route-path using the targeted lateral acceleration, and wherein the ECU is configured to activate driver assistance control or steering control based on the calculated correction route-path.

2. The vehicle as set forth in claim 1, wherein the target route-path correction device calculates a lateral position of the correction route-path by modifying a lateral position of the target route-path in accordance with the targeted lateral position of the correction route-path being acquired, calculates an attitude angle of the correction route-path by modifying an attitude angle of the target route-path in accordance with the targeted lateral velocity of the correction route-path being acquired, and calculates a curvature of the correction route-path by modifying a curvature of the target route-path in accordance with the targeted lateral acceleration of the correction route-path being acquired.

3. The vehicle as set forth in claim 2, wherein a first lateral position compensation-quantity is set at an initial value of lateral deviation at a time of starting a running-route assistance control in the lateral position compensation-quantity setting device, and a second lateral position compensation-quantity is set at zero therein.

4. The vehicle as set forth in claim 3, further comprising a steering-quantity calculation device for calculating a target amount of steering in accordance with which a motor vehicle runs along a correction route-path acquired by the path generation device.

5. The vehicle as set forth in claim 4, wherein a transfer function model of vehicle's lateral motion from a steering angle of the motor vehicle up to a lateral position of the motor vehicle is provided in said steering-quantity calculation device; and said steering-quantity calculation device calculates a feedforward steering angle instruction by using an inverse transfer function of the vehicle's lateral motion and using a transfer function for calculating a lateral position compensation-quantity being a compensation-quantity in a lateral direction with respect to a target route-path in a target route-path correction device for calculating a correction route-path based on the lateral position compensation-quantity, on a basis of the lateral position compensation-quantity being an output of a lateral position compensation-quantity setting device for setting the lateral position compensation-quantity, and adds a feedforward steering angle instruction being calculated to the target amount of steering.

6. The vehicle as set forth in claim 2, wherein a first lateral position compensation-quantity is set at zero in the lateral position compensation-quantity setting device, and a second lateral position compensation-quantity is set at a lateral shift-movement amount therein for avoiding a front obstacle.

7. The vehicle as set forth in claim 6, further comprising a steering-quantity calculation device for calculating a target amount of steering in accordance with which a motor vehicle runs along a correction route-path acquired by the path generation device.

8. The vehicle as set forth in claim 7, wherein a transfer function model of vehicle's lateral motion from a steering angle of the motor vehicle up to a lateral position of the motor vehicle is provided in said steering-quantity calculation device; and said steering-quantity calculation device calculates a feedforward steering angle instruction by using an inverse transfer function of the vehicle's lateral motion and using a transfer function for calculating a lateral position compensation-quantity being a compensation-quantity in a lateral direction with respect to a target route-path in a target route-path correction device for calculating a correction route-path based on the lateral position compensation-quantity, on a basis of the lateral position compensation-quantity being an output of a lateral position compensation-quantity setting device for setting the lateral position compensation-quantity, and adds a feedforward steering angle instruction being calculated to the target amount of steering.

9. The vehicle as set forth in claim 2, wherein a first lateral position compensation-quantity is set at zero in the lateral position compensation-quantity setting device, and a second lateral position compensation-quantity is set at a lateral shift-movement amount therein for performing a vehicle lane changeover toward an adjacent vehicle lane.

10. The vehicle as set forth in claim 9, further comprising a steering-quantity calculation device for calculating a target amount of steering in accordance with which a motor vehicle runs along a correction route-path acquired by the path generation device.

11. The vehicle as set forth in claim 10, wherein a transfer function model of vehicle's lateral motion from a steering angle of the motor vehicle up to a lateral position of the motor vehicle is provided in said steering-quantity calculation device; and said steering-quantity calculation device calculates a feedforward steering angle instruction by using an inverse transfer function of the vehicle's lateral motion and using a transfer function for calculating a lateral position compensation-quantity being a compensation-quantity in a lateral direction with respect to a target route-path in a target route-path correction device for calculating a correction route-path based on the lateral position compensation-quantity, on a basis of the lateral position compensation-quantity being an output of a lateral position compensation-quantity setting device for setting the lateral position compensation-quantity, and adds a feedforward steering angle instruction being calculated to the target amount of steering.

12. The vehicle as set forth in claim 2, further comprising a steering-quantity calculation device for calculating a target amount of steering in accordance with which a motor vehicle runs along a correction route-path acquired by the path generation device.

13. The vehicle as set forth in claim 12, wherein a transfer function model of vehicle's lateral motion from a steering angle of the motor vehicle up to a lateral position of the motor vehicle is provided in said steering-quantity calculation device; and said steering-quantity calculation device calculates a feedforward steering angle instruction by using an inverse transfer function of the vehicle's lateral motion and using a transfer function for calculating a lateral position compensation-quantity being a compensation-quantity in a lateral direction with respect to a target route-path in a target route-path correction device for calculating a correction route-path based on the lateral position compensation-quantity, on a basis of the lateral position compensation-quantity being an output of a lateral position compensation-quantity setting device for setting the lateral position compensation-quantity, and adds a feedforward steering angle instruction being calculated to the target amount of steering.

14. The vehicle as set forth in claim 1; further comprising a steering-quantity calculation device for calculating a target amount of steering in accordance with which a motor vehicle runs along a correction route-path acquired by the path generation device.

15. The vehicle as set forth in claim 14, wherein a transfer function model of vehicle's lateral motion from a steering angle of the motor vehicle up to a lateral position of the motor vehicle is provided in said steering-quantity calculation device; and said steering-quantity calculation device calculates a feedforward steering angle instruction by using an inverse transfer function of the vehicle's lateral motion and using a transfer function for calculating a lateral position compensation-quantity being a compensation-quantity in a lateral direction with respect to a target route-path in a target route-path correction device for calculating a correction route-path based on the lateral position compensation-quantity, on a basis of the lateral position compensation-quantity being an output of a lateral position compensation-quantity setting device for setting the lateral position compensation-quantity, and adds a feedforward steering angle instruction being calculated to the target amount of steering.

16. The vehicle as set forth in claim 1, wherein the filtering processing is a low-pass filter or a moving-average filter.

* * * * *